(12) United States Patent
Kubota et al.

(10) Patent No.: US 7,661,602 B2
(45) Date of Patent: Feb. 16, 2010

(54) METHOD AND SYSTEM FOR GENERATING IDENTIFICATION CODE TO BE PRINTED ON PRODUCTS

(75) Inventors: Kazuo Kubota, Kanagawa (JP); Teiji Kishi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 287 days.

(21) Appl. No.: 11/984,126

(22) Filed: Nov. 14, 2007

(65) Prior Publication Data

US 2008/0128518 A1 Jun. 5, 2008

(30) Foreign Application Priority Data

Nov. 15, 2006 (JP) .............................. 2006-308807

(51) Int. Cl.
G06K 19/06 (2006.01)
G06K 15/00 (2006.01)
G06Q 90/00 (2006.01)
G06F 17/00 (2006.01)

(52) U.S. Cl. ...................... 235/494; 235/487; 235/385; 235/383; 235/375

(58) Field of Classification Search .................. 235/385, 235/383, 375, 487, 494
See application file for complete search history.

(56) References Cited

FOREIGN PATENT DOCUMENTS

JP 2005-214694 8/2005

*Primary Examiner*—Michael G Lee
*Assistant Examiner*—Laura Gudorf
(74) *Attorney, Agent, or Firm*—Young & Thompson (57) ABSTRACT

A method of and a system for generating a printing ID code representing product ID information to be printed on products based on an identification information of a specific one of the products which is stored in a memory accompanying the specific product. The printing ID generation is performed by converting the identification information read in by an information reading section into an alphanumeric ID code by a notation system of base N so as to have a number of digits less than an encode ID information, converting a part of a numeric code representing a production date of the product into an alphanumeric date code by the notation system of base N and combining the alphanumeric ID code and the alphanumeric date code as a printing identification code.

10 Claims, 8 Drawing Sheets

Prohibitive character sets

Fig. 12

QR code

Fig. 13

METHOD AND SYSTEM FOR GENERATING IDENTIFICATION CODE TO BE PRINTED ON PRODUCTS

BACKGROUND OF THE INVENTION

1. Field of the Invention

The present invention relates to a method of and a system for generating a printing identification code representing identification information about a product which is printed on the product.

2. Description of Related Art

Figure 12:
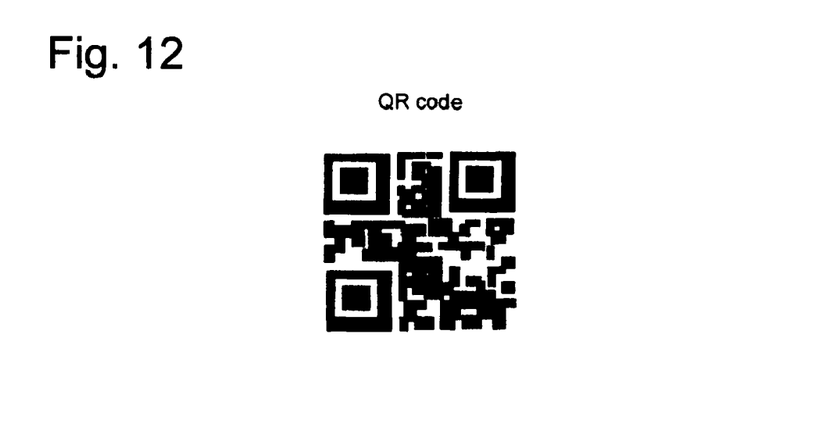
FIG. 12 is a photographic illustration showing an example of QR codes applied to a product package.
Figure 13:
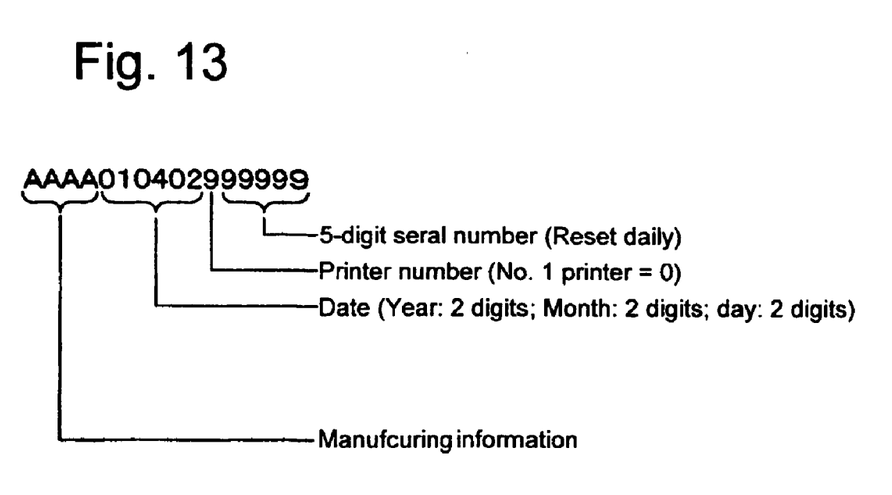
FIG. 13 is an illustration showing product information represented by the QR code illustrated in FIG. 12.

Typically, cases or packages for products accompany product identification (ID) codes such as QR codes in order to identify a product type, a production processes, a production history and the like of each specific product in the case or package. One of such QR codes is shown in FIG. 12 as an example printed on a cartridge case of a LTO type of one reel magnetic tape cartridge used as a magnetic recording medium. This QR code, which is designed to represent two dimensional product information, is scanned and subjected to image processing to provide, for example, a 16-digit alphanumeric code such as shown in FIG. 13. Specifically, the alphanumeric code consists of first four alphabetic characters representing manufacturing information, a 6-digit number representing a date (year/month/day) of manufacture or packing, a single digit number representing a printer number by which the QR code has been printed on the cartridge case and a 5-digit number representing a serial number of the magnetic tape cartridge. The translated alphanumeric code has a number of digits sufficiently enough to identify the product (magnetic tape cartridge) when used in combination with the identification information stored in an in-cartridge memory accompanying the cartridge case of the magnetic tape cartridge (which is hereinafter referred to as in-memory identification information).

In the meanwhile, in the VO manufacturing system for manufacturing magnetic tape cartridges of an LTOG1 series, an LTOG2 series, an LTOG3 series, a 3590/3592 series, a 9840/9940 series, etc. it is not unable to dispense with a QR code printed on cartridge cases by writing identification information of magnetic tape cartridges into in-cartridge memories accompanying the magnetic tape cartridges, respectively. However, because such in-memory identification information writable in the in-cartridge memory is generally confined to 8-digit alphanumeric codes, the in-memory identification code is not always enough in digit number to add information about each specific magnetic tape cartridge and, inconsequence, is hardly capable of ensuring the reliability of identification. Therefore, some types of products are hardly identifiable by in-memory identification information due to deficient digit numbers of identification codes.

SUMMARY OF THE INVENTION

It is therefore an object of the present invention to provide a method of and a system for generating a printing identification code which ensures identifiability of products even when an in-memory identification code is restricted in digit number.

The aforesaid object of the present invention is accomplished by a method of and a system for generating a printing identification code representing product identification information to be printed on a product, for example a cartridge case of a magnetic tape cartridge, based on coded identification information of the product which is stored in a memory accompanying the product. The print identification code is generated by converting coded identification information read in by identification information reading means from the memory into an alphanumeric identification code expressed by a notation system of base N which is a predetermined positive integer larger than a base of a notation system by which the coded identification information is expressed so that the alphanumeric identification code has a number of digits less than the coded identification information, converting a part of an 8-digit numeric code representing year, month and day as a production date of the product into a numeric date code expressed by the notation system of base N, and combining the alphanumeric identification code and the alphanumeric date code into a single alphanumeric character string as a printing identification code.

The coded identification information which may consist of an 8-digit alphanumeric code is converted into a 7-digit base-30 alphanumeric code after conversion by a hexadecimal notation system. In the case where a production date is expressed by an 8-digit number representing year, month and day, specifically a 4-digit number representing year and a 4-digit number representing month and day, the numeric date code is expressed by a 2-digit base-30 number provided by converting a sum of a last two-digit number of the 4-digit number representing year and a three-digit number representing a day of year corresponding to a day expressed by the 4-digit number representing month and day. It is desirable the identification code generating is performed with reference to data about prohibitive alphabetic characters which image recognition devices or optical code readers quite possibly confuse one with another.

According to the method of and the system for generating a printing identification code, since both coded identification information and coded date information are converted by a notation system of predetermined base N so as to provide an alphanumeric identification code having a number of digits particularly ideal for the representation of product identification information, it is enabled to generate a print identification code secured of identifiability based on coded in-memory identification information which is restricted in digit number.

BRIEF DESCRIPTION OF THE DRAWINGS

The foregoing and other objects and features of the present invention will be clearly understood from the following detailed description when reading with reference to the accompanying drawings in which.

DETAILED DESCRIPTION OF THE PREFERRED EMBODIMENTS

The following description is directed to a magnetic tape cartridge taken as a preferred example of products, but not limited to, for which a printing identification code is generated by the system and the method of the present invention.

Figure 1:
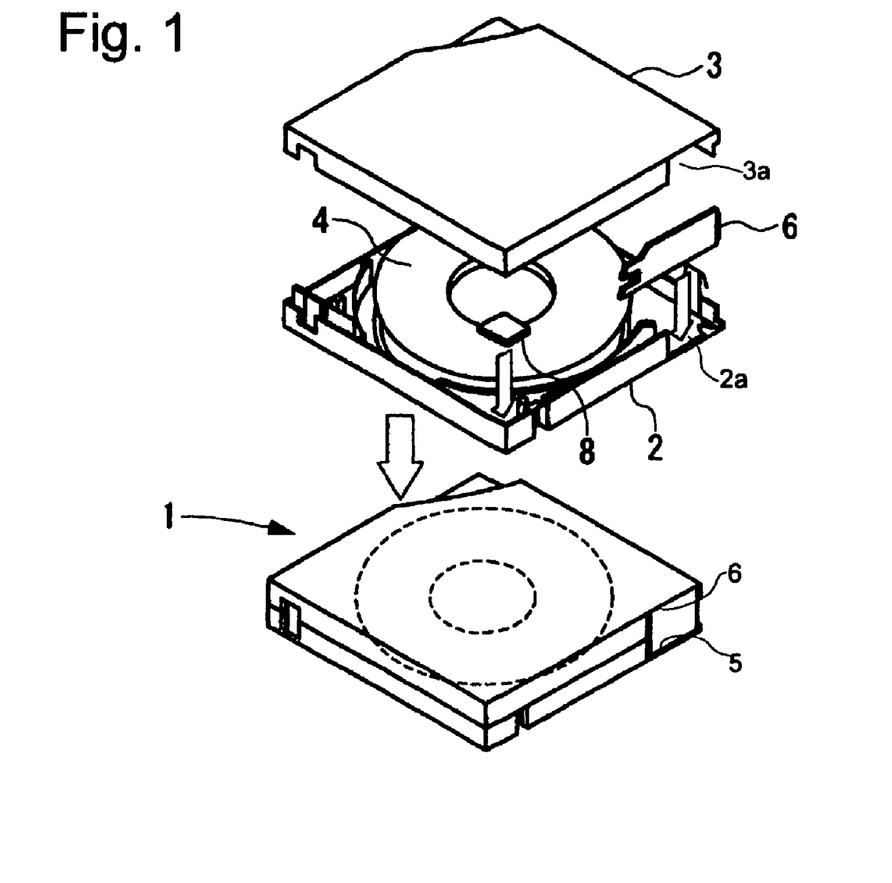
FIG. 1 is an exploded perspective view of a magnetic tape cartridge as an example of products on which an identification cord is printed.
Figure 2:
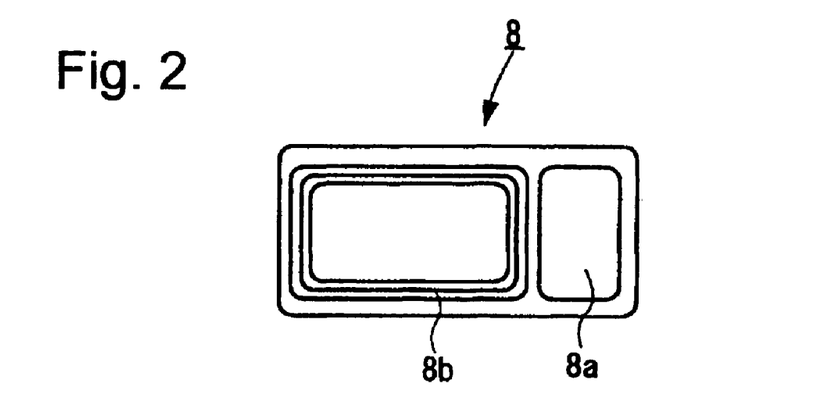
FIG. 2 is a plane view of an in-cartridge memory tag.

Referring to the accompanying drawings in detail and, in particular, to FIGS. 1 and 2 showing a magnetic tape cartridge 1 on which a printing identification code ID and an in-cartridge memory tag 8 in which product identification information is stored, respectively, the magnetic tape cartridge 1 comprises a cartridge case made up of two mating shell halves, namely a base mating shell half 2 and a top mating shell half 3, made of a plastic resin. The cartridge case forms a reel chamber for receiving a tap reel 4 with a magnetic tape wound thereon when the two mating shell halves 2 and 3 are coupled together. The cartridge case has a tape egress/ingress slot 5 formed by cuts 2a and 3a made in the base and top mating shell halves 2 and 3, respectively, and a slide door 6 which is forced closed by a spring (not shown) to prevent dust and foreign matters from getting into the interior of the magnetic tape cartridge 1 through the tape egress/ingress slot 6 and moved open against the spring to permit tape movement into and out of the magnetic tape cartridge 1 via the tape egress/ingress slot 6. Further, the magnetic tape cartridge 1 is provided with an in-cartridge memory tag 8 shown in FIG. 2 in which product identification information peculiar to the magnetic tape cartridge 1 is stored and which is preinstalled and retained in the cartridge case. As shown in FIG. 2, the in-cartridge memory tag 8 is made of a flexible sheet having a generally rectangular shape which is provided with a memory chip 8a attached thereto or embedded therein and an antenna 8b wired thereon adjacent to the memory chip 8a. The flexible sheet-formed in-cartridge memory tag 8 is known in various shape and structure and takes any form well known in the art. The flexible sheet-formed in-cartridge memory tag 8 is accessed in a non-contact manner such as electromagnetic induction or by a RFID (Radio Frequency Identification) to write information in and read information from the memory chip 8a.

The magnetic tape production line for producing the magnetic tape cartridge 1 includes a servo-writing process, a winding process, an assembling process, an inspection process and a packing process. In the servo-writing process, a servo signal is written on a stock magnetic tape supplied in the form of what is called a pancake by use of product information recording means, e.g. a servo signal writing equipment or a servo writer. Subsequently, in the winding process, the magnetic tape with servo signals recorded thereon is unwound from a roll of the stock magnetic tape and wound on an empty tape reel preset on a tape winding machine. It is usual in the winding process to run several tape winding machines concurrently. In the assembling process, the tape reel with the magnetic tape wound thereon is placed in position in the base mating shell half 2 together with the slide door 6 and the in-cartridge memory tag 8. Then, the top mating shell half 3 is put on top of the base mating shell half 2 and coupled to it by means of setscrews, so as thereby to assemble them to a magnetic tape cartridge 1. In the inspection process, the magnetic tape cartridge 1 is subjected to a data reading-data writing test of the magnetic tape to examine defective recording characteristics of the magnetic tape included therein. The magnetic tape cartridge 1 with the magnetic tape judged acceptable is conveyed to a storage site for packing.

Figure 3:
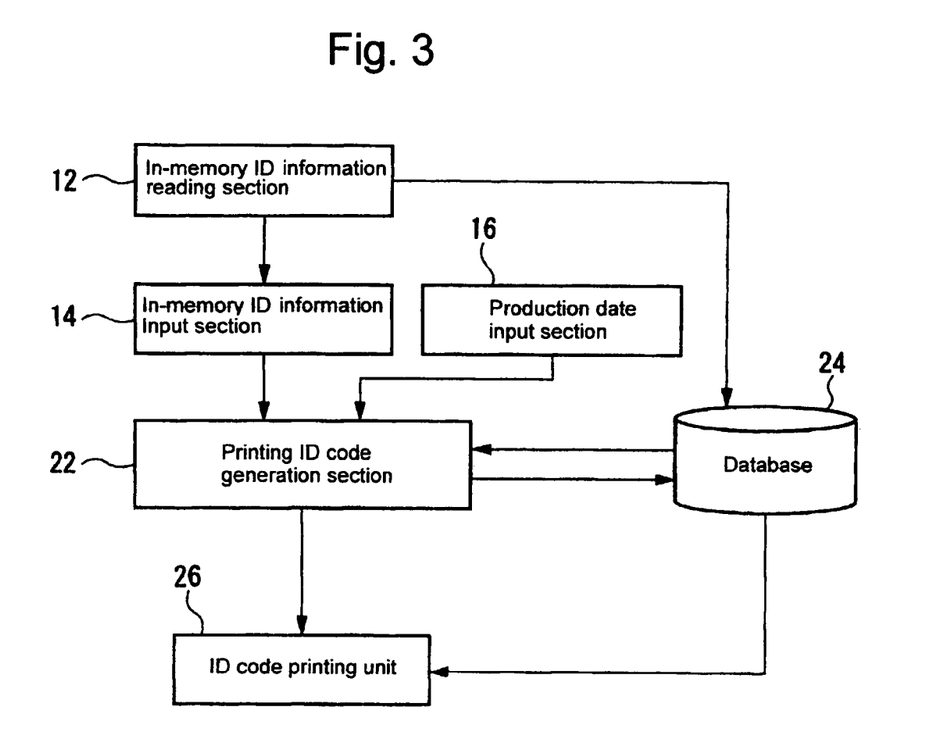
FIG. 3 is a block diagram illustrating a printing identification code generation system according to one embodiment of the present invention.
Figure 4:
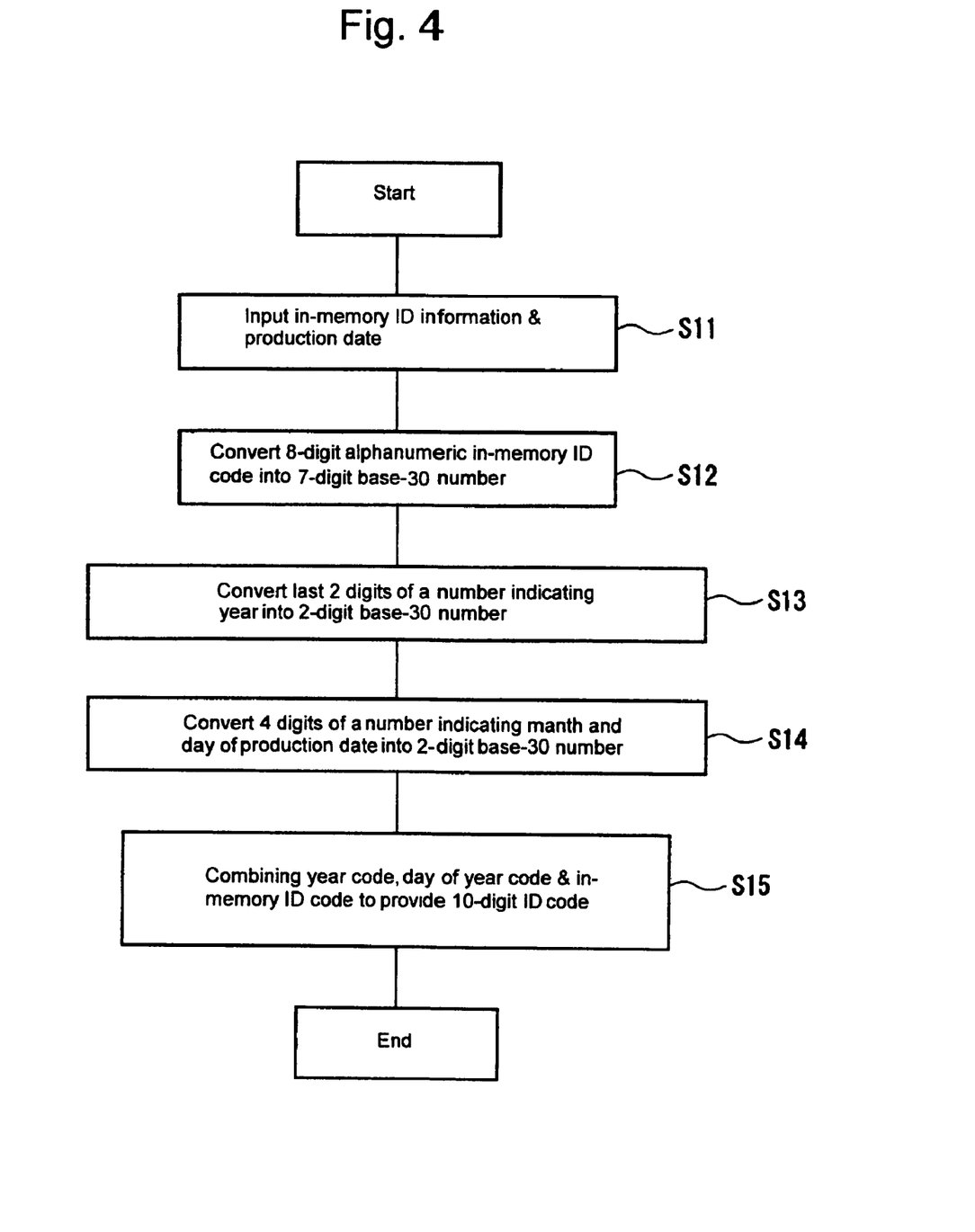
FIG. 4 is a flowchart illustrating a sequence of generating a printing identification code.
Figure 5:
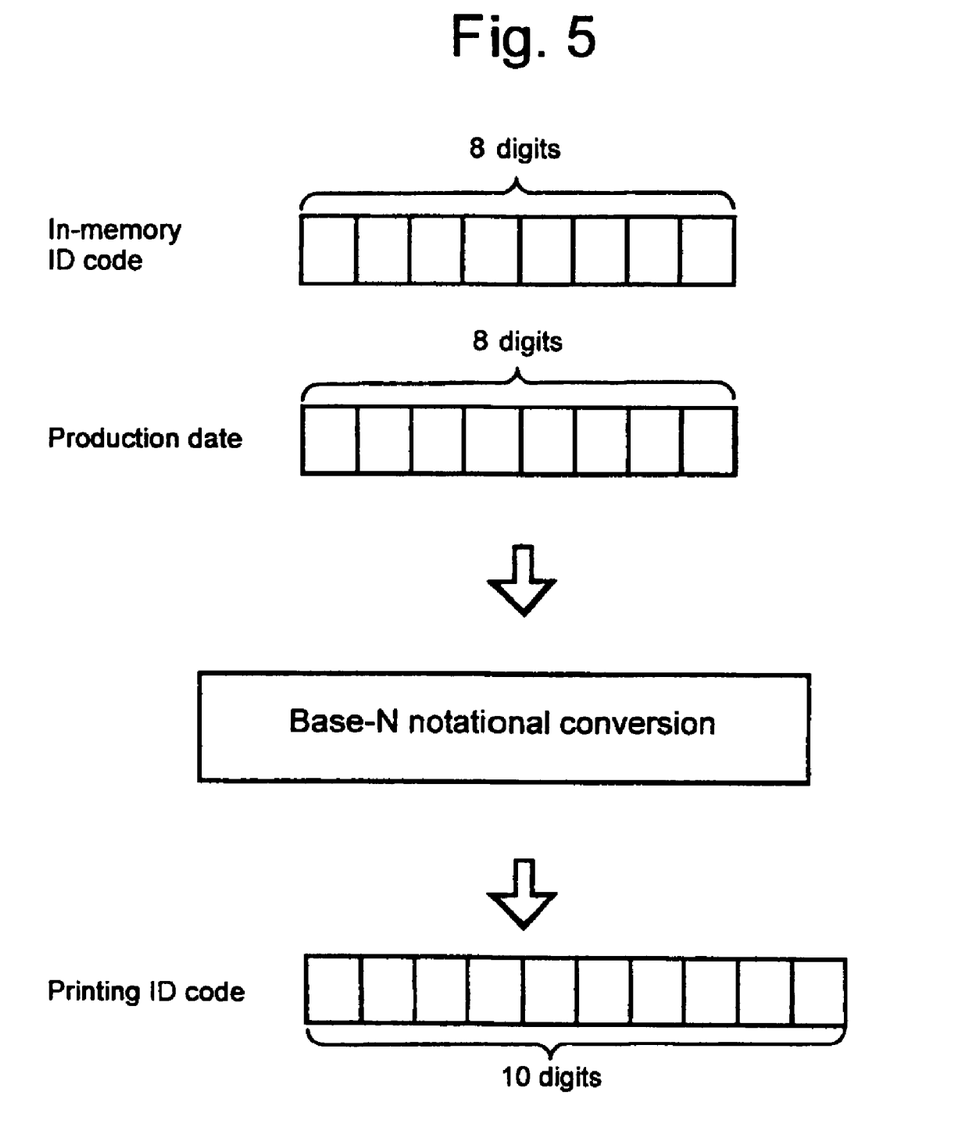
FIG. 5 is an illustration showing the sequence of generating a printing identification code.
Figure 6:
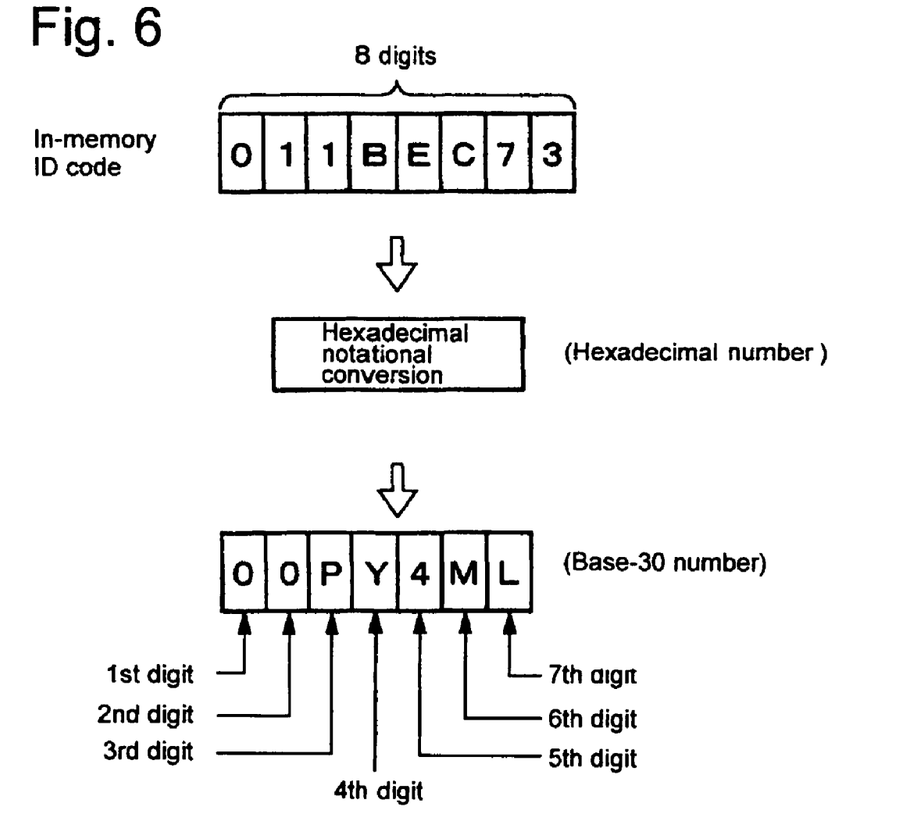
FIG. 6 is an illustration showing a sequence of conversion of an in-memory identification code into a bese-30 alphanumeric code.
Figure 7:
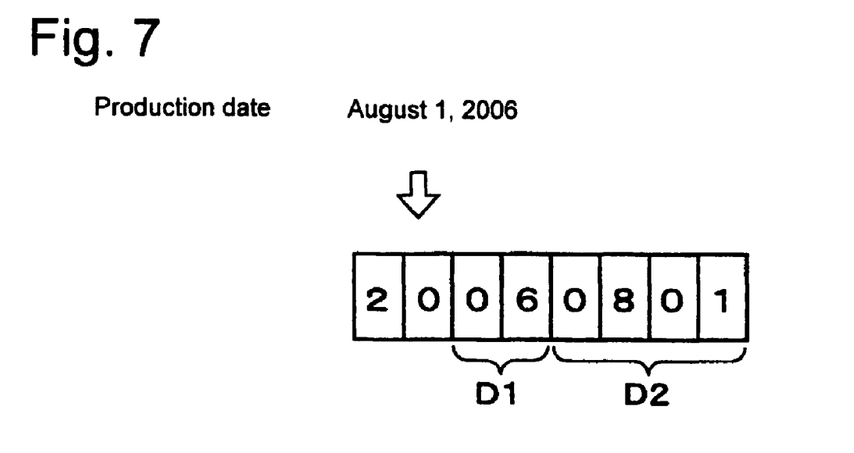
FIG. 7 is an illustration showing a date code representing a production date in the form of year, month and day.

Referring to FIG. 3 showing a system for generating a printing identification code to be printed on magnetic tape cartridges 1, the printing identification code generating system comprises an in-memory identification information read-in section 12, an in-memory identification information input section 14, a production date input section 16, a printing identification code generating section 22 and a database 24. The in-memory identification information read-in section 12 reads in product identification information from the memory chip 8a of the in-cartridge memory tag 8 and sends it to the in-memory identification information input section 14. A production date in the form of year/month/day on which each specific magnetic tape cartridge 1 is produced is inputted through the production date input section 16. The in-memory identification information and the production date are inputted into the printing identification code generating section 22 through the in-memory identification information input section 14 and the production date input section 16, respectively. Otherwise, the printing identification generating section 22 may read in product identification information and a production date of each specific magnetic tape cartridge 1 from the database 24 in which the product identification information and the production date of the magnetic tape cartridges 1 have been stored when there is a demand for generation of printing identification code of the magnetic tape cartridge 1. Further, the in-memory identification information and the production date of each specific magnetic tape cartridge 1 read by the in-memory identification information input section 14 and the production date input section 16, respectively, may be stored in the database 24 once. The printing identification code generating system is connected to an identification code marking or printing unit 26 and provides signals of representation of the printing identification code generated by the printing identification code generating section 22 for the identification code printing unit 26. The identification code printing unit 26 prints the printing identification code on an external surface of the magnetic tape cartridge 1 by means of, for example, hot stamping according to the signals. In this instance, the printing identification code generating section 22 may be connected to the identification information input section 14, the production date input section 16, the database 24 and the identification code printing unit 26 through a local area network (LAN). All or any of the in-memory identification information read-in section 12, the printing identification code generating section 22 and the identification code printing unit 26 may be installed in their associated implementation sites of the respective processes. FIGS. 4 and 5 illustrate a flowchart of a sequence of generating the printing identification code by the printing identification code generating system shown in FIG. 3 and a progress of printing identification code generation, respectively. In this embodiment, as shown in FIG. 6, the in-memory identification information is represented by an 8-digit alphanumeric code and, as shown in FIG. 7, a production date is represented by an 8-digit numeric code consisting of a first 4-digit number indicating Christian year and a next 4-digit number indicating month and day. When the control commences, the sequential logic proceeds to step S11 wherein a process is implemented to read in an in-memory identification code from the memory chip 8a of the in-cartridge memory tag 8 of a magnetic tape cartridge 1 and a production date (year/month/date) set by an operator, or otherwise by the system itself, and to input them into the printing identification code generating section 22 through the identification information input section 14 and the production date input section 16, respectively. The printing identification code generating section 22 may read in the identification code and the production date from the database 24. A printing identification code is generated in the form of a 10-digit alphanumeric code, or otherwise a desired digit alphanumeric code, in a base-N notation system after notational conversions in steps S12 through S14 which will be described below. In this instance, the symbol "N" as used herein is a base value, for example 30 in this embodiment, of a notation system and is set to a value greater than a base value of a notational system in which the in-memory ID code before conversion is represented.

Specifically, in step S12, the in-memory identification code is converted into a code expressed by a base-N number in the printing identification code generating section 22. in this instance, as shown in FIG. 6, an 8-digit alphanumeric code "011BEC73" representing the in-memory identification information is converted into a hexadecimal, i.e. bese-16, alphanumeric code through a hexadecimal notational conversion and then into a trigesimal, i.e. bese-30, alphanumeric code through a trigesimal notational conversion. As a result, the in-memory identification code "011BEC73" turns out to a 7-digit trigesimal alphanumeric code "00PY4ML."

Figure 8:
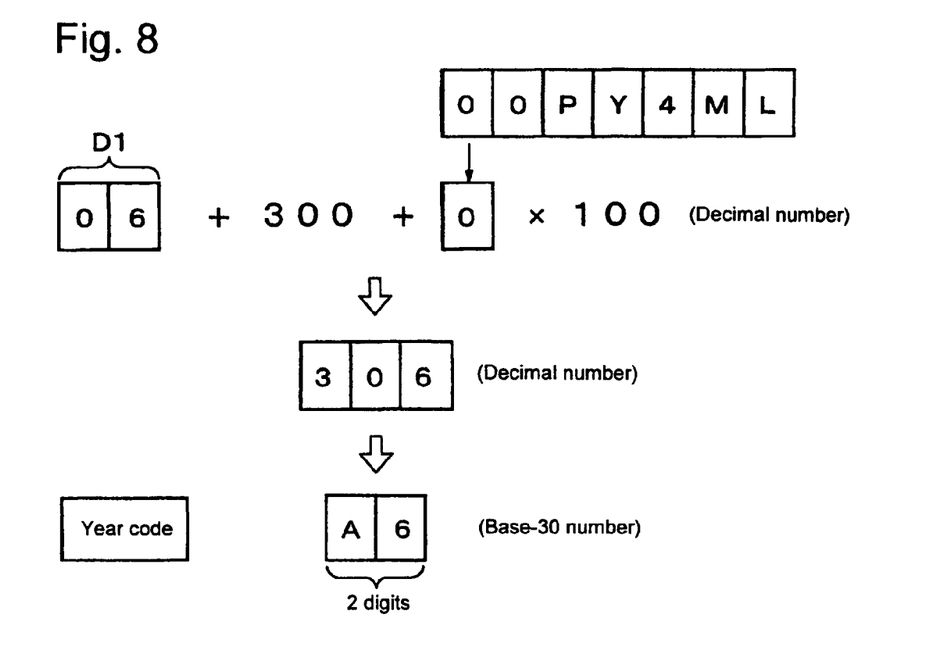
FIG. 8 is an illustration showing a sequence of encoding production year.
Figure 9:
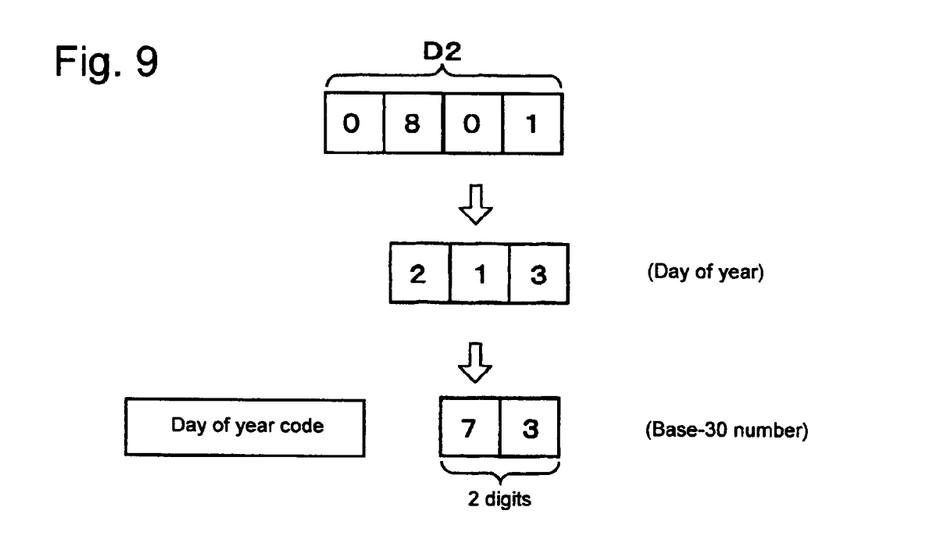
FIG. 9 is an illustration showing a sequence of encoding production month and day.

Subsequently, a notational conversion of the production date is implemented in steps S13 and S14. As shown in FIG. 7, the production date is represented by an 8-digit number such as "20060801" indicating Aug. 1, 2006. As illustrated in FIGS. 8 and 9 showing a notational conversion of the production date, a decimal number consisting of the last two digits (indicated by a reference sign "D1" in FIG. 7) of the 4-digit number representing "year" is converted into a 2-digit trigesimal or bese-30 number in step S13. Further, a number consisting of the last four digits (indicated by a reference sign "D2" in FIG. 7) representing "month" and "day" is converted into a 2-digit trigesimal or bese-30 number in step S14. Steps S13 and S14 may be replaced with each other.

Referring to FIG. 8 illustrating the procedure of a year code conversion, the last two digits "06" (D1) are extracted of the first 4-digit number indicating "year" of the production date represented by an 8-digit number and, on the other hand, the first digit "0" is extracted from the 7-digit base-30 alphanumeric code representing the in-memory identification information. Incidentally, a calculation is made to figure out the sum of a numeric value of the extracted decimal number "06" added to a predetermined decimal number "300" and a numeric value of the extracted decimal number "0" multiplied by a decimal number "100" (i.e. 0). The sum is figured out as "306" in this embodiment. Then, the sum "306" is converted into a trigesimal numeral. The notational conversion works out a 2-digit number "A6" which is used as a year code. The addition of "300" to a number consisting of the last two digits of a decimal number indicating "year" is implemented by reason of preventing the printing identification code generation from overlapping in rule with identification code generation from existing RQ codes. Implementation of this procedure prevents a 2-digit year code from comprising 2-digit numeric value.

Referring to FIG. 9 illustrating the procedure of a month-day code conversion, the four-digit numeral "0801" (D2 in FIG. 7) indicating a day of month is changed to a day of year (excluding the day of leap-year) in the form of a decimal numeric code starting "1" representing January, 1 and ending "365" representing December 31. Whereat, "August 1" represented by the numeral "0801" is the 213$^{th}$ day of year and so represented by a decimal code "213." The day of year decimal code "213" is converted into a 2-digit numeric code "73" through a trigesimal or base-30 notation system.

After the conversion of the in-memory identification code and the production date into trigesimal numeric codes, respectively, the sequence logic proceeds to step S15 where a printing identification code having a specified number of digits is generated by combining the year code, the day of year code and the identification code.

Figure 10:
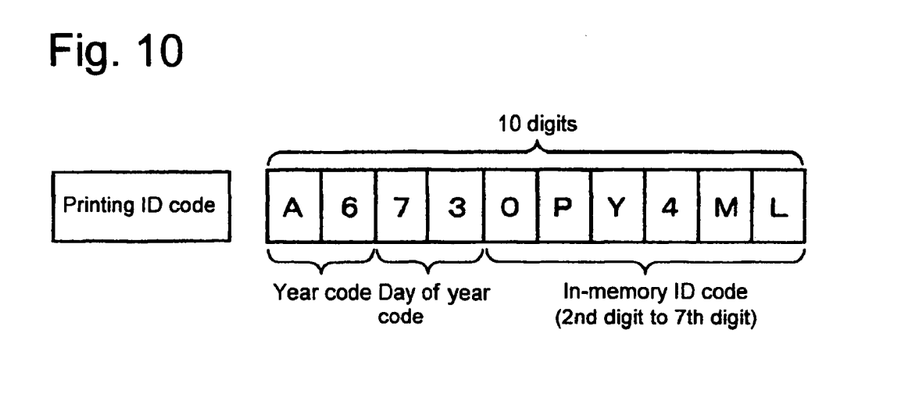
FIG. 10 is an illustration showing a sequence of combining a printing identification code and a production date code.

Specifically as shown in FIG. 10, a 10-digit alphanumeric printing identification code "A6730PY4ML" is generated by arranging and combining the alphanumeric year code "A6," the numeric day of year code "73" and an alphanumeric code "0PY4ML" formed by excluding the first digit of the alphanumeric identification code "00PY4ML" in this order. In this manner, the in-memory identification code and the production date each being represented by an 8-digit code can be abridged to a 10-digit numeric code through the specified notational conversions.

Generally, when converting an alphanumeric code by a notational system of desired base, the converted code possibly contains alphabetical letters and numerals which image recognition devices or optical code scanners confuse one with another. In order to foreclose that possibility, these confusable alphabetical letters and numerals are excluded from printing identification codes in this embodiment.

Figure 11:
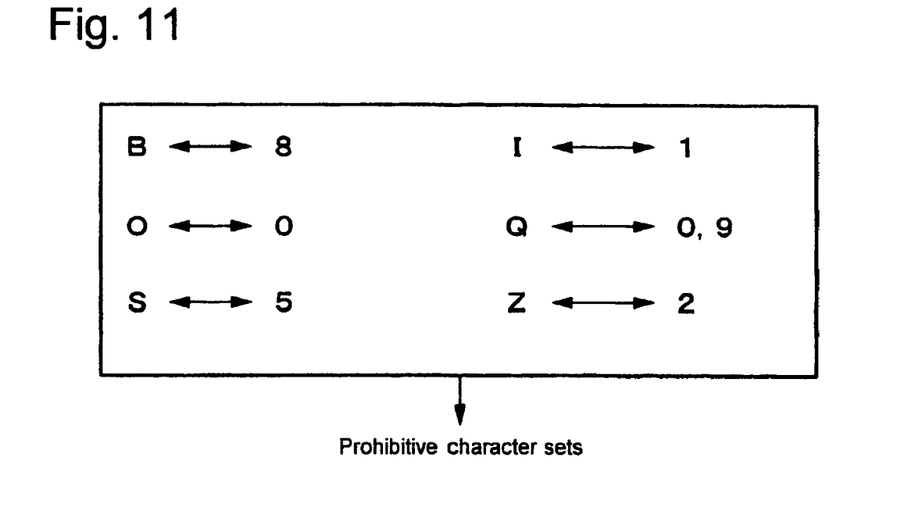
FIG. 11 is a table illustrating alphabetical characters which image recognition devices or optical code readers possibly confuse each other.

FIG. 11 shows some characters (alphabetical letters and numerals) by way of example which are confusable from the viewpoint of image recognition. Image recognition devices often confound B with 8, I with 1 (one), O with 0 (zero), Q with 0 (zero) or 9, S with 5, Z with 2, etc. Therefore, it is preferred that the database 24 is provided with a table of prohibitive sets of alphabetical letters and numerals as so that the printing identification code generating section 22 executes conversion to a base-N alphanumeric representation with reference to the table of prohibitive character sets to provide a printing alphanumeric identification code without at least either one of any prohibitive character set. In this way, printing alphanumeric identification codes are prevented from being misidentified by image recognition devices or optical code scanners.

As just described above, since the printing identification code generating system of the present invention enables to generate a printing identification code having an optimum number of digits based on coded in-memory identification information and coded production date information of a specific product by converting both coded information by means of notation systems of desired identical bases. Therefore, alphanumeric identification codes are provided based only in-memory identification codes having restricted digit numbers. Furthermore, since it is not necessary to enter other identification information, the printing identification code generating has no necessity of having information entry means other than the identification information reading means and is prevented from encountering a demand for an increased quantity of information.

It is also to be understood that although the present invention has been described with regard preferred embodiments thereof, various other embodiments and variants may occur to those skilled in the art, which are within the scope and spirit of the invention, and such other embodiments and variants are intended to be covered by the following claims.

What is claimed is:

1. An identification code generation system for generating a printing identification code representing product identification information to be printed on products based on an identification code of each specific product which is stored in a memory accompanying said specific product; said printing identification code generation system comprising:

identification information reading means for electronically reading in said identification code from said memory of said specific product;

date information providing means for providing a numeric date code representing year, month and day as a production date of said specific product; and     printing identification code generating means for converting said identification code read in from said memory by said identification information reading means into an alphanumeric identification code by a notation system of base N which is a positive integer greater than a base of a notation system by which said coded identification code is expressed so that said alphanumeric identification code has a number of digits less than said identification code, converting a part of said numeric date code provided by said date information providing means into an alphanumeric date code by said notation system of base N, and combining said alphanumeric identification code and said alphanumeric date code as said printing identification code.

2. The identification code generation system as defined in claim 1, wherein said product comprises a magnetic tape cartridge comprising a cartridge case on which said printing identification code is printed, a tape reel with a magnetic tape wound thereon installed in said cartridge case and a memory tag installed in said cartridge case.

3. The identification code generation system as defined in claim 2, wherein said identification code comprises an 8-digit alphanumeric code and is converted into a 7-digit base-30 alphanumeric code after conversion of said 8-digit alphanumeric code by a hexadecimal notation system.

4. The identification code generation system as defined in claim 2, wherein said numeric date code is an 8-digit number consisting of a 4-digit number representing year and a 4-digit number representing month and day, and said identification code generating means converts a total number of a last two-digit number of said 4-digit number representing year and a three-digit number representing a day of year corresponding to a calendar day expressed by said 4-digit number representing month and day into a 2-digit base-30 number.

5. The identification code generation system as defined in claim 2, wherein said identification code generating means is accompanied by a table of prohibitive sets of alphabetical letters and numerals with reference to which said identification code generating means generates said printing alphanumeric identification code without either one of any one of said prohibitive character sets.

6. A method of generating a printing identification code representing product identification information to be printed on products based on an identification code of each specific product which is stored in a memory accompanying said specific product; said printing identification code generation method comprising the steps of:

electronically reading in said identification code from said memory of said specific product;

providing a numeric date code representing year, month and day as a production date of said specific product;

converting said identification code read in from said memory by said identification information reading means into an alphanumeric identification code by a notation system of base N which is a positive integer greater than a base of a notation system by which said coded identification code is expressed so that said alphanumeric identification code has a number of digits less than said identification code;

converting a part of said numeric date code provided by said date information providing means into an alphanumeric date code by said notation system of base N; and     combining said alphanumeric identification code and said alphanumeric date code as said printing identification code.

7. The identification code generation method as defined in claim 6, wherein said product comprises a magnetic tape cartridge comprising a cartridge case on which said printing identification code is printed, a tape reel with a magnetic tape wound thereon installed in said cartridge case and a memory tag installed in said cartridge case.

8. The identification code generation method as defined in claim 7, wherein said identification code comprises an 8-digit alphanumeric code and is converted into a 7-digit base-30 alphanumeric code after conversion of said 8-digit alphanumeric code by a hexadecimal notation system.

9. The identification code generation method as defined in claim 7, wherein said numeric date code is an 8-digit number consisting of a 4-digit number representing year and a 4-digit number representing month and day, and said identification code generating means converts a total number of a last two-digit number of said 4-digit number representing year and a three-digit number representing a day of year corresponding to a calendar day expressed by said 4-digit number representing month and day into a 2-digit base-30 number.

10. The identification code generation method as defined in claim 7, wherein said identification code generating means is accompanied by a table of prohibitive sets of alphabetical letters and numerals with reference to which said identification code generating means generates said printing alphanumeric identification code without either one of any one of said prohibitive character sets.

\* \* \* \* \*